UNITED STATES PATENT OFFICE.

BERTRAND B. GRUNWALD, OF ALAMEDA, CALIFORNIA, ASSIGNOR TO NATIONAL MAGNESIA MANUFACTURING COMPANY, A CORPORATION OF CALIFORNIA.

PROCESS OF MANUFACTURING MAGNESIUM CARBONATE.

1,361,324.     Specification of Letters Patent.     Patented Dec. 7, 1920.

No Drawing.     Application filed March 18, 1918. Serial No. 223,144.

*To all whom it may concern:*

Be it known that I, BERTRAND B. GRUNWALD, a subject of the Emperor of Austria, and a resident of Alameda, county of Alameda, and State of California, have invented a certain new and useful Process of Manufacturing Magnesium Carbonate, of which the following is a specification.

The invention relates to a process of manufacturing magnesium carbonate and particularly light magnesium carbonate, such as is used for heat insulation purposes. The invention relates further to the process of manufacturing magnesium carbonate from magnesite.

An object of the invention is to provide a process of manufacturing magnesium carbonate from magnesite whereby the output of a given plant is increased and the cost of production of the manufactured product decreased.

The invention possesses other advantageous features, some of which, with the foregoing, will be set forth at length in the following description where I shall outline in full, one method of practising the process of my invention, but it is to be understood that other methods may be employed without departing from the spirit of my invention as expressed in the claims.

In accordance with my invention, I calcine the magnesite in a suitable kiln and recover the kiln gas. Then the calcined magnesite is finely ground and treated with water in a suitable apparatus for the purpose of hydrating the magnesia and preferably for also separating the unhydrated or dead burned particles therefrom by sedimentation. The hydrated magnesia, preferably freed of the heavy impurities, is then charged into suitable tanks and subjected to the action of carbon dioxid or washed and cooled kiln gas, preferably under pressure. This is preferably done by passing the gas through pipes depending into the tanks and submerged in the liquid therein, so that the gas after leaving the pipe rises through and is disseminated throughout the liquid. The carbon dioxid reacts with the hydrated magnesia, producing a milky mixture of magnesium bicarbonate in solution ($MgCO_3$-$H_2CO_3$) and normal magnesium carbonate ($MgCO_3.H_2O$) in suspension. After sufficient carbonation has taken place, the milky mixture is flowed from the tanks into an agitator. Ground calcined magnesite in a comparatively pure state and preferably free from dead burned particles is added to the milky mixture either in the agitator or preferably before it enters the agitator. The ground calcined magnesite is preferably added continuously to the flowing stream of milky mixture, so that it becomes evenly distributed throughout the mixture. The amount of ground calcined magnesite which is added to the milky mixture depends upon the purity of the magnesite, the amount of excess water and carbon dioxid in the mixture and on other conditions, and in actual operation I find that this amount varies from 10% to 30% of the original charge of calcined magnesite previously hydrated. The mixture is then agitated to convert the added calcined magnesite into hydrated magnesia which combines with the carbon dioxid of the mixture converting it to normal magnesium carbonate. After agitation for a sufficient length of time to insure the conversion of the calcined magnesite added, the mixture is flowed into another receptacle and heated to form basic magnesium carbonate. After precipitation, the mixture is passed through a filter to separate the water from the basic magnesium carbonate. When sufficient water has been removed to give the carbonate a thick, mushy consistency, the freshly precipitated carbonate is charged into a suitable apparatus and subjected to the action of carbon dioxid, kiln gas or air containing over 6% of carbon dioxid. This recarbonation causes the incorporation in the mixture of carbon dioxid and at the same time, the formation of magnesium bicarbonate solution. After sufficient recarbonation, the mixture is ready for drying and is charged into suitable molds for that purpose. During the process of drying, the magnesium bicarbonate decomposes into magnesium carbonate and carbon dioxid, the gas causing the carbonate to become porous and voluminous. When this quality is not desired, the recarbonation step may be omitted.

As stated, the hydrated magnesia is subjected to the action of carbon dioxid, preferably under pressure, in a tank or digester and, therefore, as the solution is discharged from the tank the excess of carbon dioxid which was held in the solution under pressure does not leave the solution immediately when the pressure is released, but continues to rise to the surface over a period of several minutes. This is, therefore, one source of excess gas.

I claim:

1. The process of manufacturing magnesium carbonate from magnesite, which consists in calcining the magnesite, treating the calcined magnesite with water to form hydrated magnesia, subjecting the liquid mass to the action of carbon dioxid under pressure in a digester whereby magnesium carbonate and magnesium bicarbonate are formed, adding calcined magnesite to the milky mixture of carbonate and bicarbonate as it comes from the digester with an excess of carbonic acid gas in solution, and agitating the resultant mixture and then heating the mixture to precipitate basic magnesium carbonate.

2. The process of manufacturing magnesium carbonate from magnesite, which consists in calcining the magnesite, treating the ground calcined magnesite with water to form hydrated magnesia, passing carbon dioxid through the liquid mass whereby magnesium carbonate and magnesium bicarbonate are formed, flowing the resultant milky mixture through a conduit and adding ground calcined magnesite continuously to the flowing mixture while it contains an excess of carbonic acid gas in solution, agitating the resultant mixture and then heating it to precipitate basic magnesium carbonate.

In testimony whereof I have hereunto set my hand at San Francisco, California, this 27th day of February, 1918.

BERTRAND B. GRUNWALD.

In presence of—
H. G. PROST.